(12) United States Patent
Han et al.

(10) Patent No.: US 7,596,902 B2
(45) Date of Patent: Oct. 6, 2009

(54) ANIMAL TRAP

(76) Inventors: Kehan Han, 2911 Anne-Hebert, Montreal (CA) H1N 3X1; Kedu Han, 4714 Mason Ct., Sugar Land, TX (US) 77479

(*) Notice: Subject to any disclaimer, the term of this patent is extended or adjusted under 35 U.S.C. 154(b) by 50 days.

(21) Appl. No.: 11/627,949

(22) Filed: Jan. 27, 2007

(65) Prior Publication Data
US 2008/0178517 A1   Jul. 31, 2008

(51) Int. Cl.
*A01M 23/16* (2006.01)
(52) U.S. Cl. ........................................................ 43/61
(58) Field of Classification Search .................. 43/60, 43/61, 62, 63
See application file for complete search history.

(56) References Cited
U.S. PATENT DOCUMENTS

| | | | | |
|---|---|---|---|---|
| 73,418 A * | 1/1868 | Wigal | ............................. | 43/73 |
| 224,498 A * | 2/1880 | Wiggins | ......................... | 43/60 |
| 426,668 A * | 4/1890 | Hovell | ............................. | 43/61 |
| 623,875 A * | 4/1899 | Brandon | ......................... | 43/61 |
| 874,654 A * | 12/1907 | Beaudry | ......................... | 43/62 |
| 1,001,639 A * | 8/1911 | Halinka | .......................... | 43/61 |
| 1,020,448 A * | 3/1912 | Recko | ............................. | 43/61 |
| 1,083,125 A | 12/1913 | Nebel | | |
| 1,181,044 A * | 4/1916 | Stringfellow | ................... | 43/61 |
| 1,213,248 A * | 1/1917 | Phillips | .......................... | 43/62 |
| 1,261,899 A * | 4/1918 | Borszcz | ......................... | 43/61 |
| 1,277,122 A * | 8/1918 | Renner | ........................... | 43/62 |
| 1,294,293 A * | 2/1919 | Margo | ........................... | 43/61 |
| 1,444,934 A * | 2/1923 | Miller | ............................ | 43/61 |
| 1,491,188 A * | 4/1924 | Berenyi | .......................... | 43/61 |
| 1,501,213 A * | 7/1924 | Garrison | ........................ | 43/61 |
| 1,607,563 A * | 11/1926 | Prokop | ........................... | 43/61 |
| 1,648,160 A * | 11/1927 | Boedecker | ....................... | 43/62 |
| 1,722,879 A * | 7/1929 | Abel | .............................. | 43/61 |
| 1,734,855 A * | 11/1929 | Hendricks | ....................... | 43/61 |
| 1,765,081 A * | 6/1930 | Lee | ................................ | 43/61 |
| 1,784,904 A * | 12/1930 | Merkl | ............................ | 43/61 |
| 1,790,575 A * | 1/1931 | Csontos | ......................... | 43/60 |
| 2,016,049 A * | 10/1935 | Pritchett | ........................ | 43/61 |
| 2,038,068 A * | 4/1936 | Wagner | ......................... | 43/61 |
| 2,138,092 A | 11/1938 | Evans | | |
| 2,232,604 A * | 2/1941 | Helmick | ........................ | 43/61 |
| 2,284,867 A * | 6/1942 | Harris | ........................... | 43/61 |
| 2,499,682 A * | 3/1950 | Reeb | ............................. | 43/61 |
| 2,540,418 A * | 2/1951 | Bird | .............................. | 43/61 |
| 2,562,809 A * | 7/1951 | Mogren | ........................ | 43/61 |
| 2,587,748 A * | 3/1952 | Merkl | ........................... | 43/61 |
| 2,616,210 A * | 11/1952 | Reeb | ............................. | 43/61 |
| 2,725,661 A * | 12/1955 | Bowman | ........................ | 43/61 |
| 2,774,175 A * | 12/1956 | Maddocks | ...................... | 43/61 |
| 3,426,470 A * | 2/1969 | Rudolph | ........................ | 43/61 |
| 4,682,440 A * | 7/1987 | Hunter | .......................... | 43/61 |
| 4,688,348 A * | 8/1987 | Chu | ................................ | 43/61 |
| 4,899,484 A * | 2/1990 | Morin | ............................ | 43/61 |
| 4,991,340 A | 2/1991 | Schildt | | |
| 5,778,594 A * | 7/1998 | Askins et al. | .................. | 43/61 |
| 5,960,583 A | 10/1999 | Hansson | | |
| 6,029,393 A * | 2/2000 | Stewart | ......................... | 43/63 |
| 6,415,544 B1 | 7/2002 | Leyerle et al. | | |
| 6,484,436 B1 * | 11/2002 | Chang | ........................... | 43/61 |
| 6,658,788 B1 * | 12/2003 | Steinfest | ........................ | 43/61 |
| 2002/0178647 A1 * | 12/2002 | Lafforthun | ..................... | 43/61 |

* cited by examiner

*Primary Examiner*—Kurt Rowan

(57) ABSTRACT

A novel type of an animal trap is provided for trapping animals of different sizes. The mechanism for controlling rotative movement of the trapping means provides high sensitivity of the trap. The trap is easy and safe to use and suitable for the purpose of controlling household rodents, such as mice, rats, or the like.

10 Claims, 9 Drawing Sheets

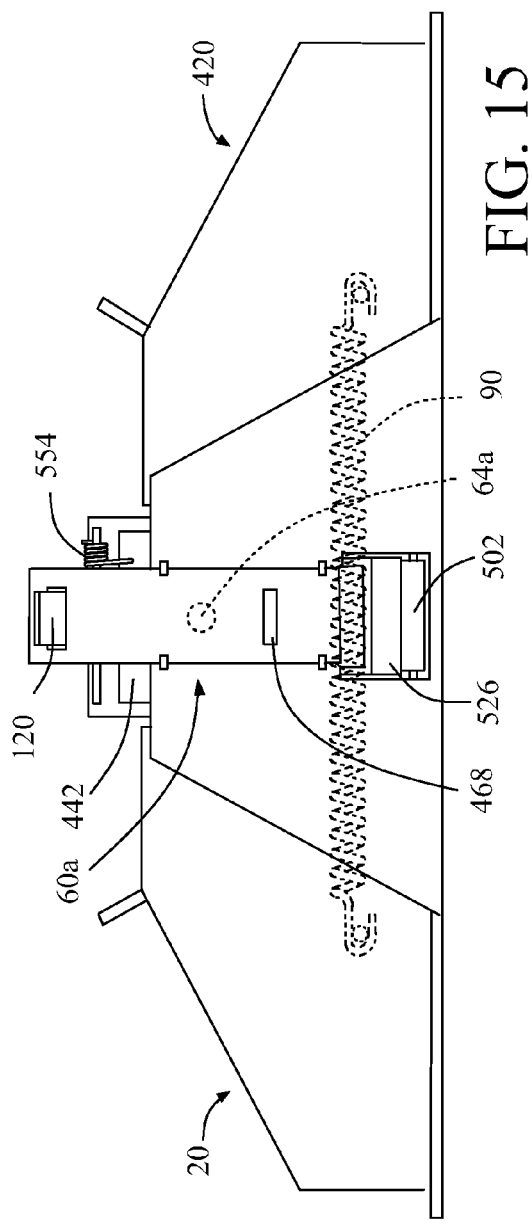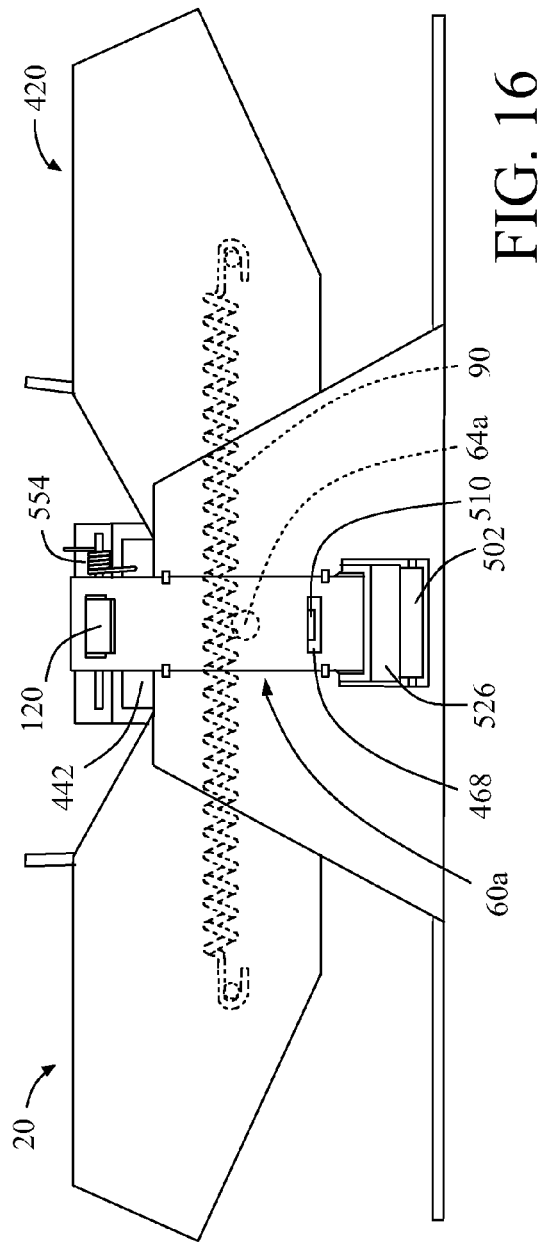

ANIMAL TRAP

FIELD OF THE INVENTION

This invention relates to animal traps and more particularly to traps targeting animals of different sizes like mice, rats, and rodents.

BACKGROUND OF THE INVENTION

Animal traps are well known in the art. The most common type of animal traps has been a snap trap with bait attached to a trigger mechanism which can lock and release a spring loaded striker to slam the animal attempting to take the bait. This type of trap has an inherent disadvantage. The trap can be difficult and dangerous to load since the trigger mechanism has to be manipulated with hand in the striking zone. It is quite often that the striker is released accidentally and hurt the user's hand.

A variety of animal trap designs have been proposed to overcome aforementioned disadvantage. One type of traps comprises a base, a jaw pivotally mounted on the base, a trigger, and a spring extending between the base and the jaw. This type of traps is so arranged that, when the jaw is rotated to an open position, the tension line of the spring is slightly above the pivot axis, which maintains the jaw in the open position. The jaw can be moved by the animal taking the bait. When the displacement brings the tension line passing through the pivot axis, the trap is triggered to close. The trap may be made of sheet metal, such as described in U.S. Pat. No. 2,138,092 to Evans, or made of molding plastic, such as described in U.S. Pat. No. 6,415,544 to Leyerle, et al. This type of traps reduces the danger to the user since it is set by pressing rear end of the jaw which is outside of the striking zone. However, this type of traps has limited sensitivity because a certain animal weight is required to move the jaw to pass the pivot axis of rotation to close. Another type of traps has been designed to entrap instead of striking the animal. The trap usually comprises a casing with one or two open ends for the entrance of animals, and a trigger which actuates moving open ends to close. For the trap having two open ends constitute a through runway, a wary animal may be more apt to venture into it than into a trap having only one open end. For example, U.S. Pat. No. 4,688,348 to Chu describes an animal trap comprising a main body and two rotative doors. Each door is controlled by a latch. A trigger actuates both latches to move and causes the two doors close simultaneously. The trap can be used with or without bait when it is placed against a wall. This type of traps is safer but more complicated to use.

There is still a need for a novel type of animal trap which is highly sensitive, easy to set and safe to use.

SUMMARY OF THE INVENTION

The present invention provides a novel type of animal traps. The present invention further provides a method of using the same.

The animal trap according to the present invention comprises a base, a trapping means capable of moving rotatively from an open position in which the trapping means provides an entrance for an animal to a close position in which the trapping means is closed to trap the animal. The animal trap further comprises a trigger and a novel control mechanism having at least one movable pivotal member which is capable of moving from a release position to a latch position. When the pivotal member is in the latch position, the trapping means can be held in the open position. When the pivotal member is in the release position, the trapping means moves from the open position to the close position. The trigger is operative to releasably hold the movable pivotal member in the latch position. When the trigger is released, the pivotal member moves from the latch position to the release position and subsequently the trapping means moves to close.

The animal trap according to the present invention minimizes the danger to the user since the trigger setting is outside of the striking zone. The control mechanism cooperated with the trigger provides an optimal high sensitivity such that one trap may catch animals of different sizes.

It is one object of the present invention to provide an animal trap with optimal high sensitivity for targeting animals of different sizes.

It is another object of the present invention to provide an animal trap that is easy and safe to use as a common household tool.

It is another objective of the present invention to provide an animal trap that is inexpensive, effective, and durable.

Additional features and advantages of the present invention are described in, and will be apparent from, detailed description of the preferred embodiments and from the illustrative drawings.

BRIEF DESCRIPTION OF THE DRAWINGS

FIG. 15 is a front view of the trap of FIG. 10, showing the movable housing in the close position and the movable pivotal member in the release position.

FIG. 16 is a front view of the trap of FIG. 10, showing the movable housing in the open position and the movable pivotal member latched in the latch position.

DETAILED DESCRIPTION OF THE PREFERRED EMBODIMENTS

Figure 1:
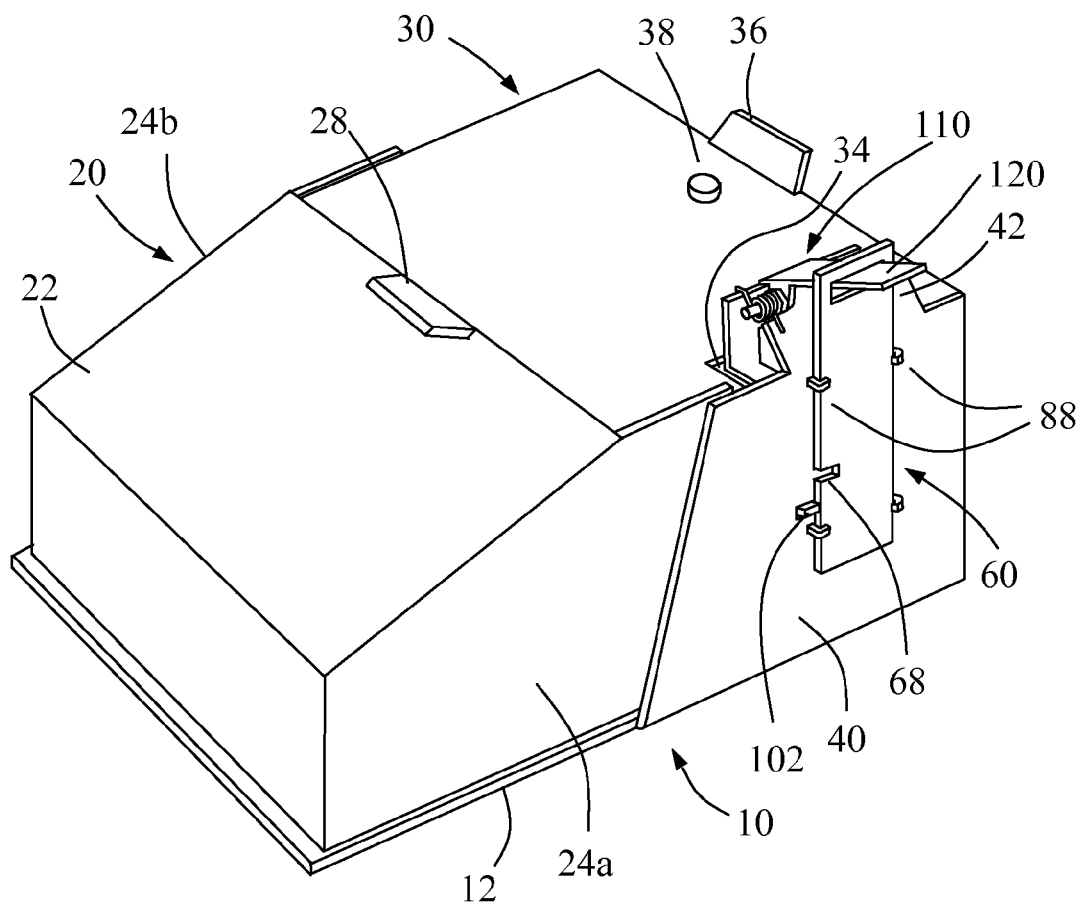
FIG. 1 is a perspective view of a first preferred embodiment having a movable housing.

Referring to drawings wherein like numerals refer to like parts, FIG. 1 illustrates a first preferred embodiment having a housing 20 as trapping means. Housing 20 cooperates with a base 10 and a top cover plate 30 to form a complete enclosure. As shown in detail in FIG. 2, base 10 comprises a platform portion 12, side wall portions 40 and 50, and a rear wall portion 14 having a forwardly horizontally extending portion 16 with a threaded opening 18. Housing 20 comprises a top portion 22, a forward wall portion, side wall portions 24a and 24b with rearwardly extending arms 26a and 26b, respectively. Top portion 22 may tilt forwardly downwardly at an angle of approximately 30° relative to base 10. Cover plate 30 comprises an opening 32, a side recess 34, and an upwardly rearwardly extending grip portion 36 which cooperates with a grip portion 28 disposed on the rear edge of top portion 22 to facilitate manipulation. Cover plate 30 is removably mounted on extending portion 16 by a fasting screw 38 passing through opening 32 and threadedly screwing on opening 18. Housing 20 fits between side wall portions 40 and 50 with the rear edge of top portion 22 slightly over the forward edge of cover plate 30, as shown in FIG. 1.

Figure 3:
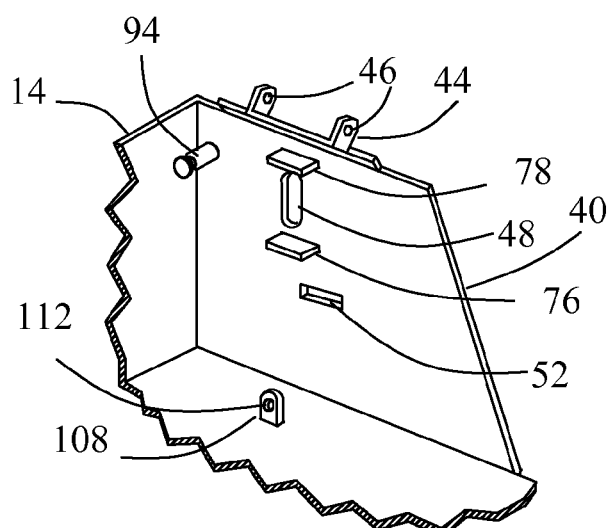
FIG. 3 is a fragmentary perspective view of the inside of the wall portion of the trap of FIG. 1.
Figure 4:
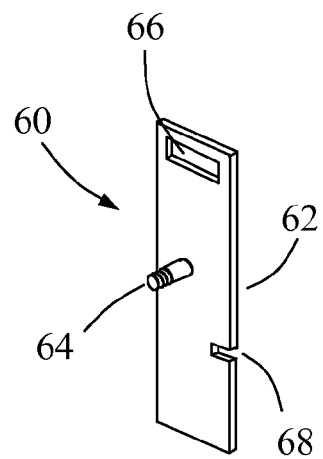
FIG. 4 is a perspective view of the movable pivotal member showing the pin portion and the base portion.
Figure 2:
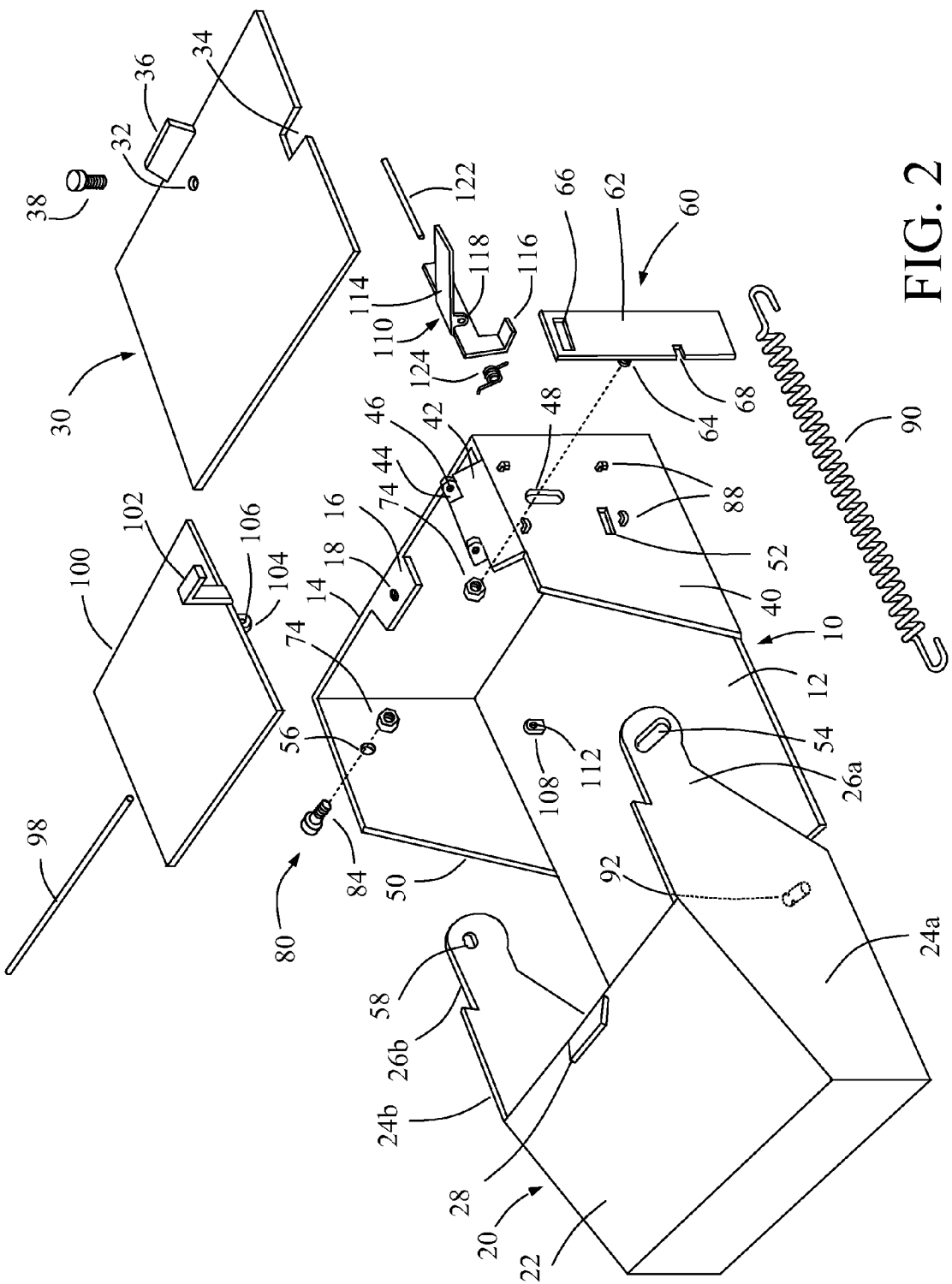
FIG. 2 is an exploded view of the trap of FIG. 1.

As shown in FIG. 2, side wall portion 40 comprises a tilted top extending portion 42 which inclines inwardly at an angle of approximately 45° relative to side wall portion 40. Extending portion 42 comprises a pair of spaced pivot lugs 44 having transversally aligned pivot openings 46. Side wall portion 40 further comprises a vertical slot 48 and a rectangular opening 52. Arm 26a of housing 20 comprises a round rear end having an oblique slot 54. Arm 26a is movably mounted on side wall portion 40 with a movable pivotal member 60. As shown in FIG. 4, movable pivotal member 60 comprising a base portion 62 and a pin portion 64. Base portion 62 comprises a rectangular opening 66 near the top and a horizontal groove 68 at the front side edge. Pin portion 64 comprises a smooth shank portion and a threaded end portion. Pin portion 64 extends through vertical slot 48 of wall portion 40 and oblique slot 54 of arm 26a and is fastened with a threaded lock nut 74. As shown in FIG. 3, the inside of wall portion 40 comprises horizontal flanges 76 and 78 disposed below and above vertical slot 48 to prevent arm 26a from moving upwardly and downwardly. Wall portion 40 further comprises multiple restricting members 88 laterally embracing base portion 62 such that pivotal member 60 can only move upwardly and downwardly.

As shown in FIG. 2, side wall portion 50 comprises a round opening 56. Arm 26b of housing 20 comprises a round rear end having a round opening 58. Arm 26b is movably mounted on side wall portion 50 by a pivot pin 80 comprising a knob end portion and a pin portion 84. Pin portion 84 comprises a smooth shank portion and a threaded end portion. Pin portion 84 extends through opening 56 and opening 58 and is fastened with another threaded lock nut 74.

Pivotal member 60 may move vertically between a release position in which pin portion 64 engages with the upper end of vertical slot 48 and a latch position in which pin portion 64 engages with the lower end of vertical slot 48. When pivotal member 60 is in the release position, pin portions 64 and 84 are transversally aligned and forming a pivot axis such that housing 20 can be rotated from a close position to an open position. When housing 20 is rotated to the open position, the upper edge of arm 26a is engaged with the forward side edge of inwardly extending portion 42 and the rotative movement is stopped. In this situation, slots 54 and 48 are superposed completely and permit pin portion 64 to move downwardly such that pivotal member 60 can move from the release position to the latch position. When pivotal member 60 is in the latch position, pin portions 64 and 84 are nonaligned and the rotative movement of housing 20 is hindered.

Figure 5:
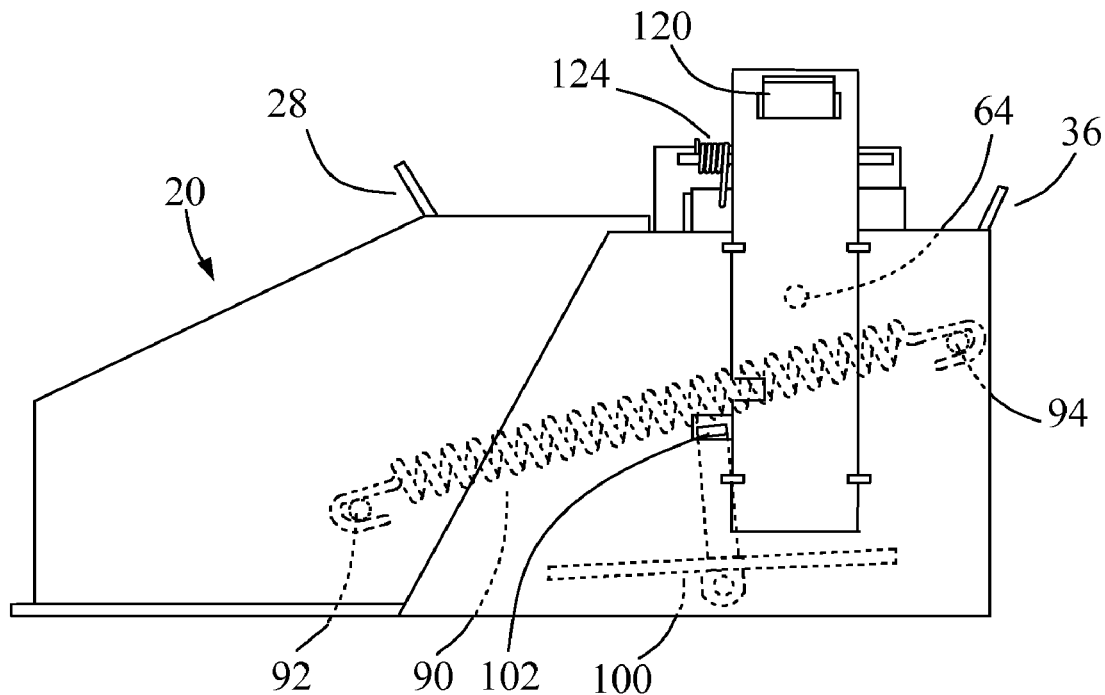
FIG. 5 is a side view of the trap of FIG. 1, showing the movable housing in the close position and the movable pivotal member in the release position.

A tension spring 90 with two hooked ends is provided. One end hooks on a shaft 92 disposed on the inside of wall portion 24a of housing 20. Another end hooks on a shaft 94 disposed on the inside of wall portion 40, as shown in FIG. 5. Housing 20 can be rotatively moved from the close position to the open position by grasping grip portion 36 and pulling grip portion 28 upwardly rearwardly against spring tension force. The extent of rotation of housing 20 is approximately 30°. For the tension line of spring 90 is below the pivot axis defined by pin portions 64 and 84, spring 90 exerts a closing force on housing 20. FIG. 5 illustrates movable pivotal member 60 in the release position and housing 20 closes by the spring tension force.

As shown in FIG. 2, a trigger pedal member 100 comprises a forward platform portion, a rear portion, and a side upwardly extending portion with a latching member 102 which extends laterally outwardly therefrom and protrudes through opening 52. Trigger pedal member 100 comprises a pair of spaced pivot lugs 104 having transversally aligned pivot openings 106. Base 10 comprises a pair of spaced pivot lugs 108 having transversally aligned pivot openings 112. A pivotal shaft 98 extends through pivot openings 112 and 106 such that trigger pedal member 100 may tilt forwardly or rearwardly on base 10. The balance of the forward portion and the rear portion is so arranged that trigger pedal member 100 tends to tilt rearwardly with the forward platform portion raised. When pivotal member 60 is in the latch position, latching member 102 falls into groove 68 such that pivotal member 60 is latched.

A locking mechanism is integrated with the trigger mechanism to prevent a trapped animal from forcefully raising housing 20 from inside. The locking mechanism comprises a locking member 110 having an upper portion 114, a vertical middle portion, and a horizontal lower lock portion 116 extending horizontally outwardly. Upper portion 114 extends upwardly outwardly at an angle of approximately 45° relative to the middle portion of locking member 110. Upper portion 114 comprises a pair of spaced pivot lugs with transversally aligned openings 118. The top end of upper portion 114 extends through opening 66 and serves as a press handle 120.

In the assembling of the trigger mechanism and locking mechanism, a pivotal shaft 122 extends through pivot openings 46 and 118, and a torsion spring 124. Torsion spring 124 exerts a force on press handle 120 to move pivotal member 60 upwardly and turns lock portion 116 protruding outwardly until lock portion 116 engages with the inside surface of wall portion 40. In this situation, protruded lock portion 116 hinders arm 26a from moving upwardly such that housing 20 is locked in the close position. When press handle 120 is pressed to turn a distance between the upper edge and the lower edge of opening 66, locking portion 116 turns inwardly towards the space defined by recess 34 of cover plate 30. Arm 26a is unlocked and housing 20 can be rotated. When housing 20 rotates to the open position, press handle 120 can be further pressed downwardly against the lower edge of opening 66 to push pivotal member 60 to the latch position.

Bait may be placed on the platform portion of trigger pedal member 100 accessed by opening housing 20 or by removing cover plate 30.

Figure 6:
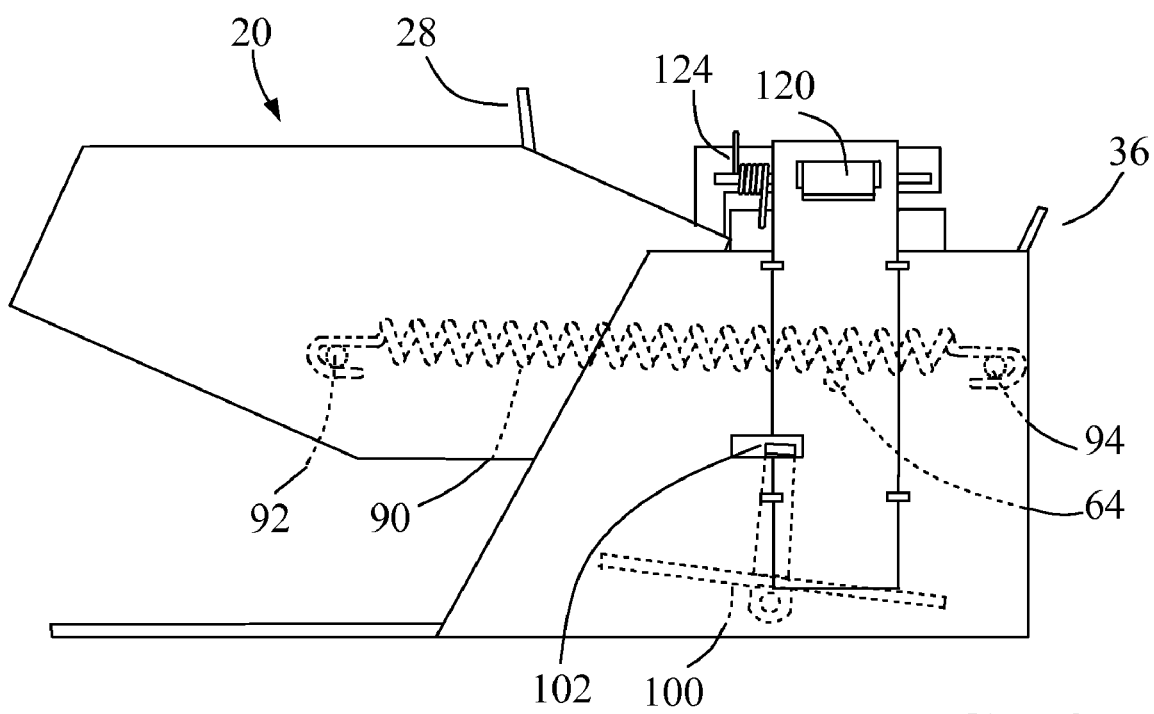
FIG. 6 is a side view of the trap of FIG. 1, showing the movable housing in the open position and the movable pivotal member latched in the latch position.

To set the trap, press handle 120 is pressed against the force of torsion spring 124 to unlock housing 20. Then housing 20 is rotated upwardly while press handle 120 is continuously pressed. When housing 20 is rotated to open position, slot 48 and slot 54 are superposed completely such that pivotal member 60 can be pressed to move downwardly. When pivotal member 60 moves to the latch position in which said pin portion 64 has passed over the tension line of spring 90, trigger pedal member 100 tilts rearwardly and latching member 102 falls into downwardly shifted groove 68 and pivotal member 60 is latched in the latch position when the pressure is released. In this situation, pin portion 64 is below the tension line such that tension spring 90 exerts a turning force in the opposite direction on arm 26a of housing 20 and in fact helps hold housing 20 in the open position, as shown in FIG. 6. The positioning of the tension line above pin portion 64 and nonalignment of pin portions 64 and 84 retain housing 20 in the open position.

When a targeted animal steps on the forward portion of trigger pedal member 100, latching member 102 moves forwardly out of groove 68 such that pivotal member 60 is released and pulled upwardly by torsion spring force exerted on press handle 120. Pivotal member 60 moves upwardly from the latch position to the release position and pin portion 64 passes over the tension line, causing housing 20 to close. When the upper edge of arm 26a rotates downwardly to the close position, the horizontal lock portion 116 protrudes outwardly and locks housing 20 in the close position.

Figure 7:
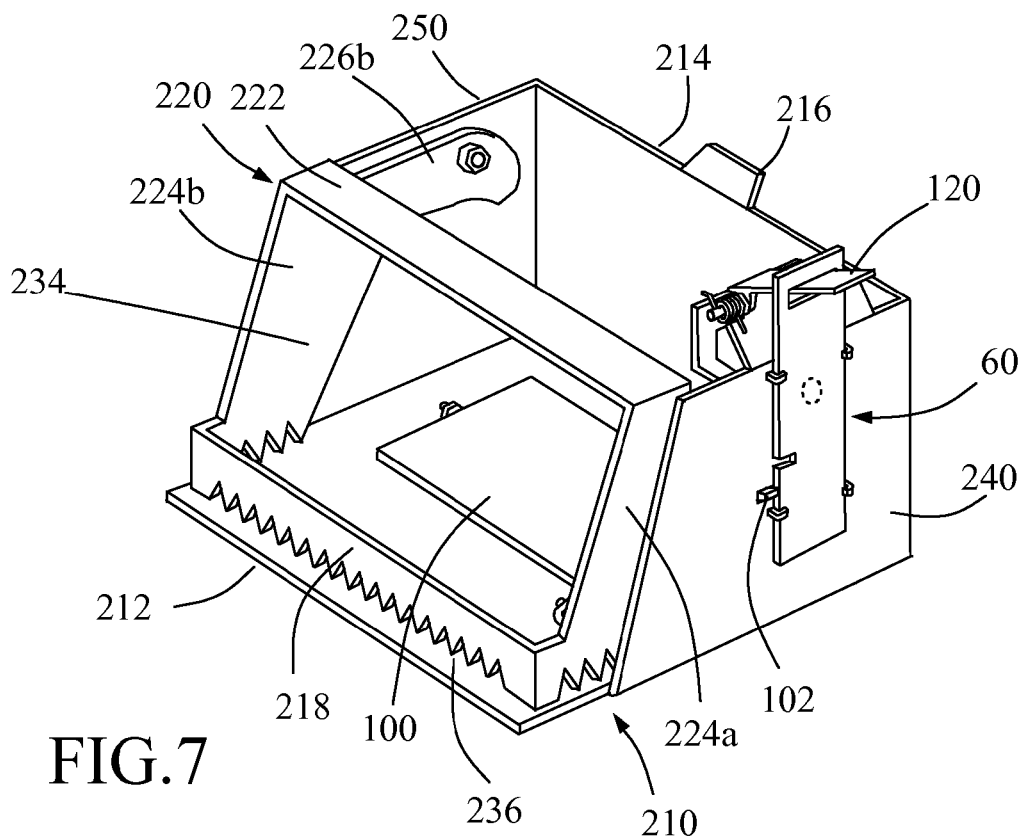
FIG. 7 is a perspective view of a second preferred embodiment having a striker.

FIG. 7 illustrates a second preferred embodiment in which a striker 220 is employed as trapping means to slam the animal. Striker 220 is movably mounted on a base 210. Base 210 comprises a platform portion 212, side wall portions 240 and 250, and a rear wall portion 214 with an extending grip portion 216. Striker 220 comprises a striker bar 218, side portions 224a and 224b with rearwardly extending arms 226a and 226b, respectively, and a transversal top portion 222 which connects side portions 224a and 224b. The upper edge of striker bar 218, the forward edges of side portions 224a and 224b, and the forward edge of top portion 222 form a forward opening 234. Striking teeth 236 may be formed along the lower edges of striker bar 218 and side portions 224a and 224b. Striker 220 fits between side wall portions 240 and 250. The components disposed on side wall portions 240 and 250 are structurally the same as those disposed on side walls 40 and 50, respectively, as described in detail in the first preferred embodiment. And the components disposed on side portions 224a and 224b are structurally the same as those disposed on side wall portions 24a and 24b, respectively, as described in detail in the first preferred embodiment. The arrangements of the trigger mechanism and the locking mechanism are the same as those described in the first preferred embodiment so that they are omitted.

In use, bait can be placed on trigger pedal member 100 accessed through forward opening 234. Press handle 120 is pressed to unlock striker 220. Then striker 220 is rotated upwardly by gripping transversal top portion 222 and grip portion 216 by hand. When striker 220 is rotated to the open position, pivotal member 60 is pressed to move downwardly to the latch position and then latched by latching member 102.

Figure 8:
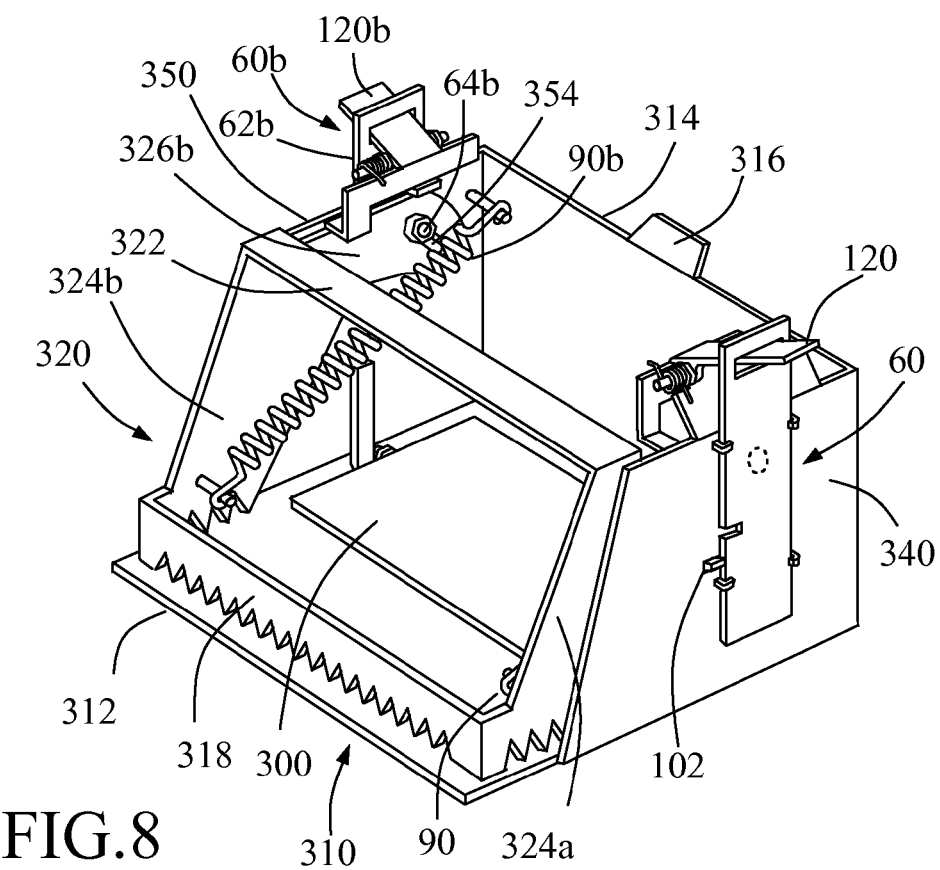
FIG. 8 is a perspective view of a third preferred embodiment having two movable pivotal members.
Figure 9A:
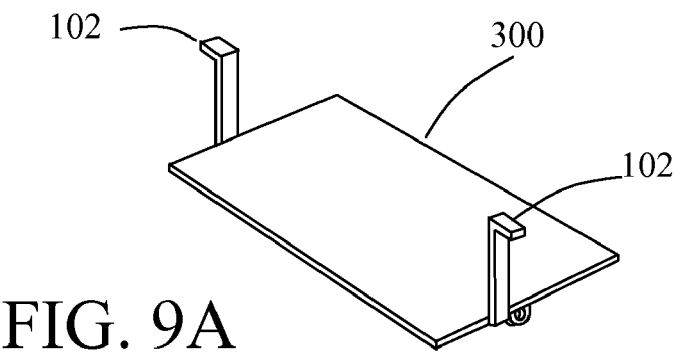
FIG. 9A is a perspective view of the trigger pedal of the trap of FIG. 8.
Figure 9B:
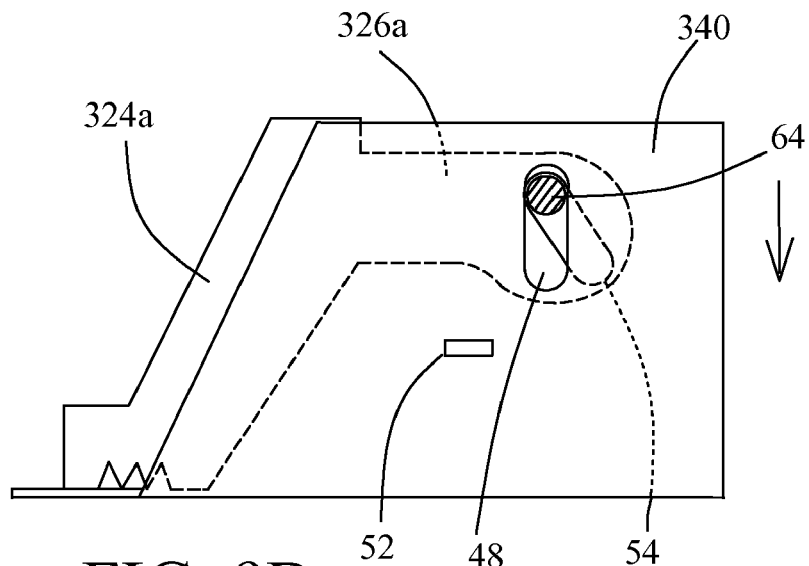
FIG. 9B is a fragmentary schematic side view of the trap of FIG. 8, showing the position of the pin portion when the movable pivotal member is in the release position.
Figure 9C:
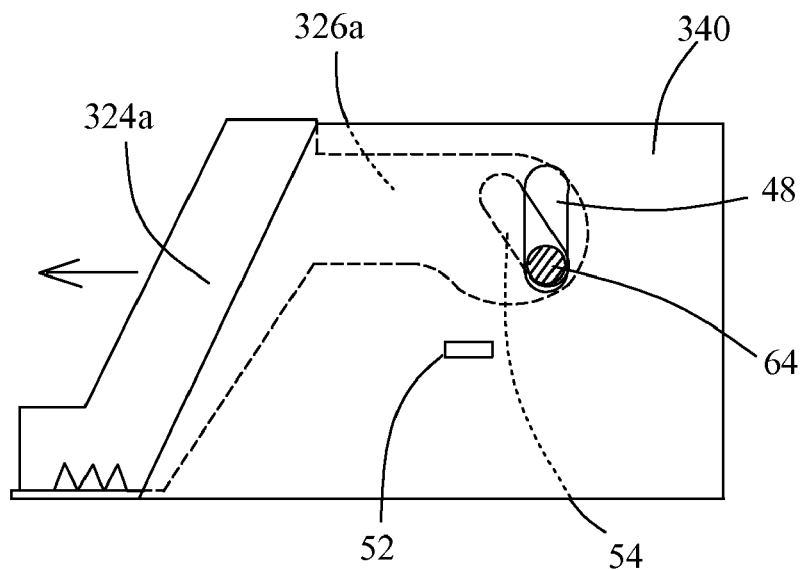
FIG. 9C is a fragmentary schematic side view of the trap of FIG. 8, showing the displacement of the arm of the trapping means when the movable pivotal member moves to the latch position.

FIG. 8-9C illustrates a third preferred embodiment in which a pivotal member 60b and pivotal member 60 work together to control rotative movement of a striker 320. As shown in FIG. 8, a base 310 comprises a platform portion 312, side wall portions 340 and 350, and a rear wall portion 314 with an extending grip portion 316. The components disposed on side wall portions 340 and 350 are structurally the same as those disposed on side wall portion 240 as described in the second preferred embodiment. The components disposed on side wall portions 340 and 350 are symmetrically arranged. Striker 320 comprises a striker bar 318, side portions 324a and 324b with rearwardly extending arms 326a and 326b, respectively, and a transversal top portion 322. Like extending arm 24a described in the first preferred embodiment, extending arm 326a comprises a round rear end having oblique slot 54. Similar to extending arm 326a, extending arm 326b comprises a round rear end having an oblique slot 354. Striker 320 fits between side wall portions 340 and 350. Like pivotal member 60, pivotal member 60b comprises pin base 62b and pin portion 64b. Arm 326a is mounted on side wall portion 340 by pivotal member 60 and arm 326b is mounted on side wall portions 350 by pivotal member 60b. One side view of the trap is a mirror image of the other side view, as shown in FIG. 8. Pin portions 64 and 64b form a pivot axis upon which striker 320 rotates. The components of the trigger mechanism and the locking mechanism on each side are structurally the same as described previously and are symmetrically arranged. As shown in FIG. 9A, a trigger pedal member 300 comprises a pair of side upright extending portions having latching members 102 on each side and protruding horizontally outwardly. Trigger pedal member 300 is tiltedly mounted on base 310 and operative to simultaneously hold pivotal members 60 and 60b in the latch position or simultaneously release pivotal members 60 and 60b to move from the latch position to the release position. Tension spring 90 is hooked between side wall portion 340 and side portion 324a. Another tension spring 90b may be hooked between side wall portion 350 and side portion 324b, as shown in FIG. 8. When pivotal members 60 and 60b are in the release position, the tension line is below the pivot axis formed by pin portions 64 and 64b such that tension springs 90 and 90b always pull striker 320 downwardly to the close position.

When striker 320 is in open position, oblique slots 54 and 354 are completely superposed with vertical slots 54 on each side, respectively, such that pivotal members 60 and 60b can be moved from the release position to the latch position. When pivotal members 60 and 60b are in the latch position while striker 320 is in open position, the tension line is just above the pivot axis formed by pin portions 64 and 64b. In this situation, tension springs 90 and 90b pull striker 320 upwardly and maintains striker 320 in the open position. When pivotal members 60 and 60b move from the latch position to the release position, the pivot axis passes over the tension line, causing striker 320 to close.

It should be understood that because the pivotal members on both side are symmetrically arranged, the trigger mechanism of this trap can be set without loading trapping means. First, both press handles 120 and 120b are forcefully pressed to force pivotal members 60 and 60b moving downwardly. When pin portions 64 and 64b are forced to move along vertical slots 48 on side wall portions 340 and 350, respectively, the wedge effect on the edges of oblique slots 54 and 354 forces arms 326a and 326b to displace forwardly until pin portions 64 and 64b engage with the lower ends of vertical slots 48 and then pivotal members 60 and 60b are latched in the latch position. FIG. 9B illustrates the position of pin portion 64 when movable pivotal member 60 is in the release position. The arrow head indicates the direction of movement of pin portion 64. FIG. 9C illustrates the position of pin portion 64 and the displacement of arm 326a when movable pivotal member 60 moves to the latch position. The arrow head indicates the direction of displacement of arm 326a. On the opposite side, the change of the position of pin portion 64b is the same as that of pin portion 64 as shown in FIG. 9B and FIG. 9C. When pivotal members 60 and 60b is latched in the latch position the trap can be placed in a desired position. Finally striker 320 can be rotated upwardly to the open position.

Figure 10:
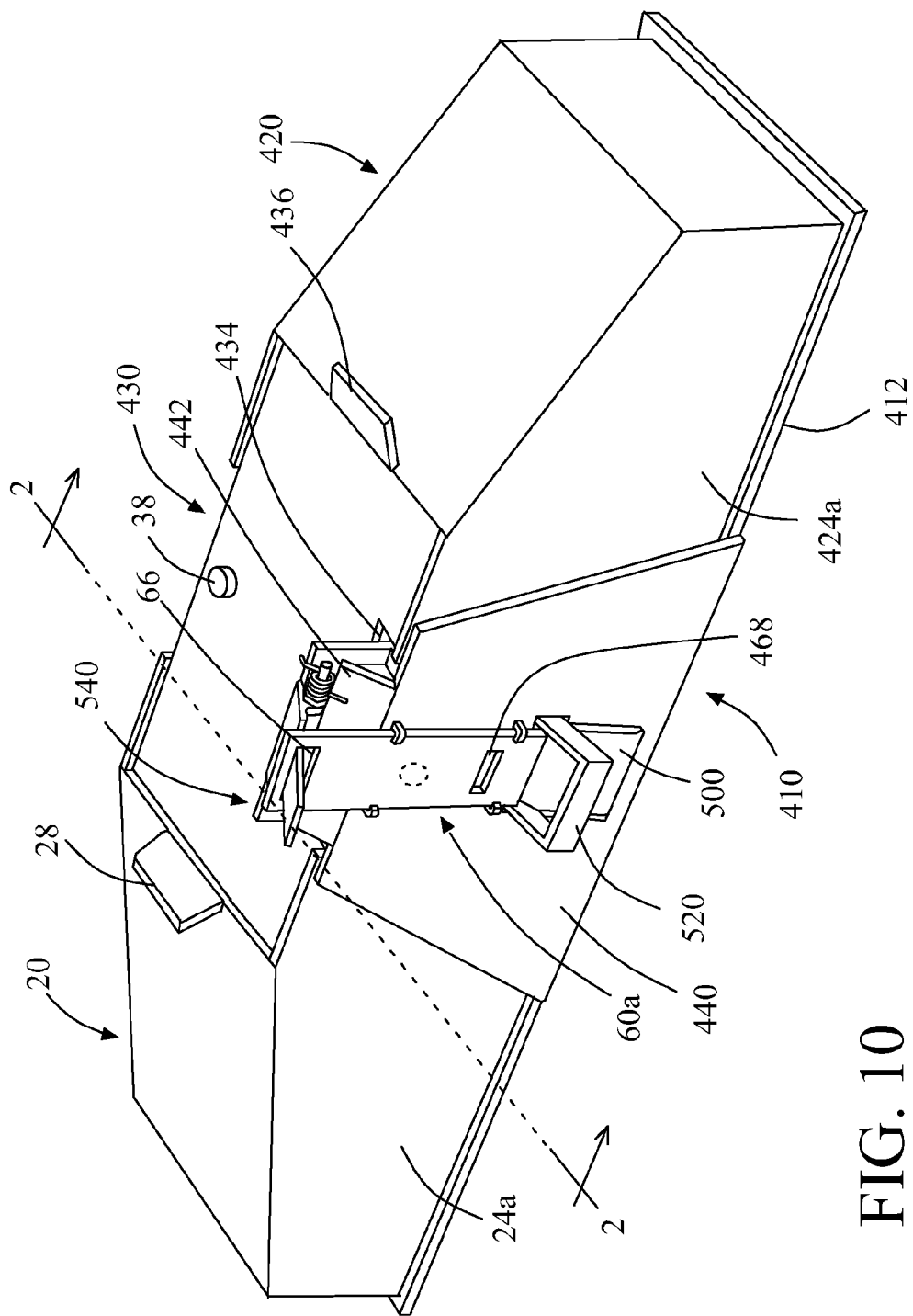
FIG. 10 is a perspective view of a fourth preferred embodiment having two movable housings.

FIG. 10 illustrates a fourth preferred embodiment in which two rotative housings 420 and 20 are employed as trapping means. Housings 420 and 20 are symmetrically mounted on a base 410 and cooperate with base 410 and a top cover plate 430 to form a complete enclosure. As shown in detail in FIG. 11, base 410 comprises a platform portion 412, a forward side wall portion 440, and a rear side wall portion 450. Forward side wall portion 440 comprises a tilted extending portion 442 which inclines rearwardly inwardly at an angle of approximately 45° relative to forward side wall portion 440. Rear side wall portion 450 comprises a forwardly horizontally extending portion 416 with a threaded opening 418. Cover plate 430 comprises an opening 432 near the rear edge and two spaced recesses 434 at the forward edge. As described in the first preferred embodiment, housing 20 comprises the top portion, the side wall portion, forward side wall portion 24a with inwardly extending arm 26a, and rear side wall portion 24b with inwardly extending arm 26b. Similar to housing 20, housing 420 comprises a top portion, a side wall portion, a forward side wall portion 424a with an inwardly extending arm 426a, and a rear side wall portion 424b with an inwardly extending arm 426b. The top portions of housings 20 and 420 may tilt laterally downwardly at an angle of approximately 30° relative to base 410, as shown in FIG. 10. Housings 20 and 420 fit between wall portions 440 and 450 with arms 26a and 26b partially crossing over arms 426a and 426b, respectively. Cover plate 430 is mounted on extending portion 416 by fasting screw 38 passing through opening 432 and threadedly screwing on opening 418. The side edges of cover plate 430 are under the inner edges of the top portions of housings 20 and 420, respectively, as shown in FIG. 10.

Figure 11:
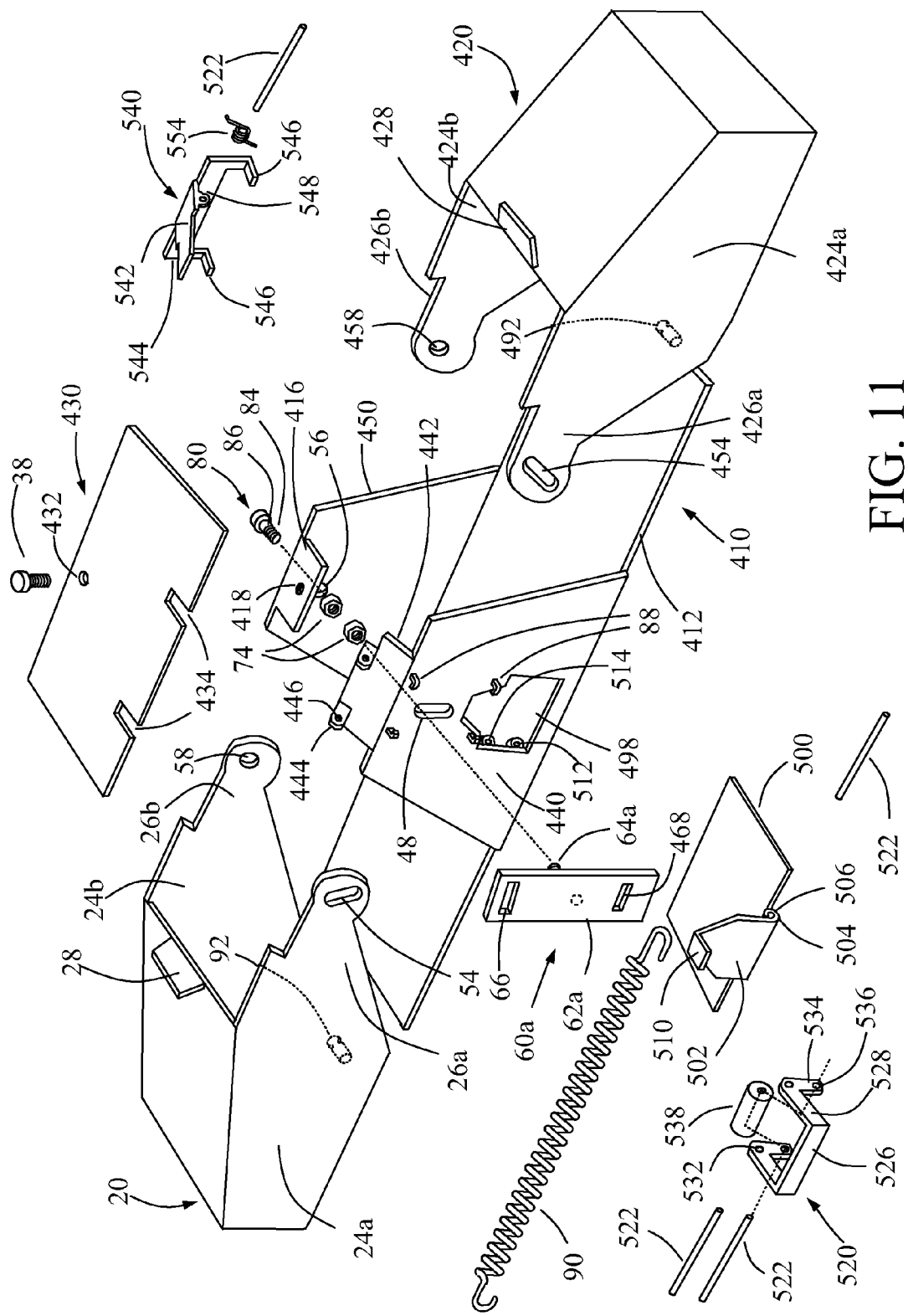
FIG. 11 is an exploded view of the trap of FIG. 10.
Figure 12:
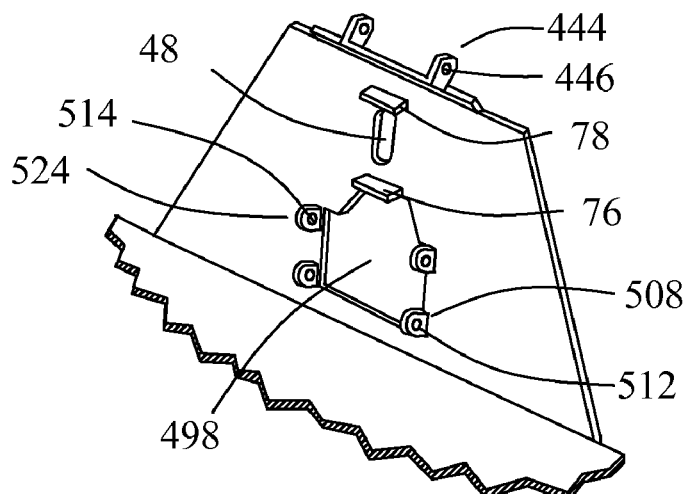
FIG. 12 is a fragmentary perspective view of the inside of the wall portion of the trap of FIG. 10.

As shown in FIG. 11, forward side wall portion 440 comprises vertical slot 48. Arm 26a comprises the round end having oblique slot 54. Arm 426a comprises a round end having an oblique slot 454. A pivotal member 60a comprises pin portion 64a and a base portion 62a which has rectangular opening 66 near the top and a rectangular opening 468 near the bottom. Pin portion 64a comprises a shank portion and a threaded end portion. Pin portion 64a extends through vertical slot 48 and oblique slots 54 and 454 and is fastened with threaded lock nut 74. Thus arms 26a and 426a are coaxially movably mounted on forward side wall portion 440. Forward wall portion 440 further comprises multiple restricting members 88 laterally embracing base portion 62a such that pivotal member 60a can only move upwardly and downwardly. As shown in FIG. 12, the inside of forward side wall portion 440 comprises horizontal flanges 76 and 78 disposed below and above vertical slot 48 to prevent arms 26a and 426a from moving upwardly and downwardly.

As shown in FIG. 11, rear side wall portion 450 comprises round opening 56. Arm 26b comprises the round end having round opening 58. Arm 426b comprises a round end having a round opening 458. Pin portion 84 of pivot pin 80 extends through opening 56 and openings 58 and 458 and is fastened with another threaded lock nut 74. Thus arms 26b and 426b are coaxially movably mounted on rear side wall portion 450.

Like pivotal member 60, pivotal member 60a may move vertically between a release position in which pin portion 64a engages with the upper end of vertical slot 48 and a latch position in which pin portion 64a engages with the lower end of vertical slot 48. When pivotal member 60a is in the release position, pin portions 64a and 84 are transversally aligned and forming a pivot axis such that housings 20 and 420 can pivotally rotate from a close position to an open position.

When housings 20 and 420 are rotated to the open position, the rotative movements are stopped because the upper edges of arms 26a and 426a are engaged with corresponding side edges of inwardly tilted extending portion 442 of side wall portion 440, respectively. In this situation, both slots 54 and 454 are completely superposed with slot 48 and permit pivotal member 60a to move from the release position to the latch position. When pivotal member 60a moves to the latch position, pin portions 64a and 84 are nonaligned such that the rotative movements of housings 20 and 420 are hindered.

Tension spring 90 with two hooked ends is provided. One end hooks on shaft 92 disposed on the inside of wall portion 24a of housing 20. Another end hooks on a shaft 492 disposed on the inside of wall portion 424a of housing 420. Housings 20 and 420 can be rotated from the close position to the open position by pulling grip portion 28 disposed on the top portion of housing 20 and a grip portion 428 disposed on the top portion of housing 420 upwardly inwardly against the tension force of spring 90. The extent of rotation of housings 20 and 420 may be approximately 30°. For the tension line of the spring is still below the pivot axis formed by pin portions 64a and 84 when housings 20 and 420 are in the open position, spring 90 exerts a closing force on both housings 20 and 420.

Extending portion 442 comprises a pair of spaced pivot lugs 444 having transversally aligned pivot openings 446. Forward wall portion 440 further comprises an opening 498 sized for receiving a trigger pedal member 500 and a pedal lift member 520. Trigger pedal member 500 comprises a rear platform portion, a forward upright portion 502, and a pair of spaced pivot lugs 504 having transversally aligned pivot openings 506. Upright portion 502 comprises a horizontal latching member 510 extending forwardly. Pedal lift member 520 comprises a forward portion 526, two side portions 528, and a pair of transversally aligned pivot openings 532. Each side portion 528 has a downwardly extending portion 534 with an opening 536. A pivotal shaft 522 passes through the center of an elastic means in the form of a rubber roller 538 and openings 536 such that rubber roller 538 is placed between extending portions 534.

Figure 13:
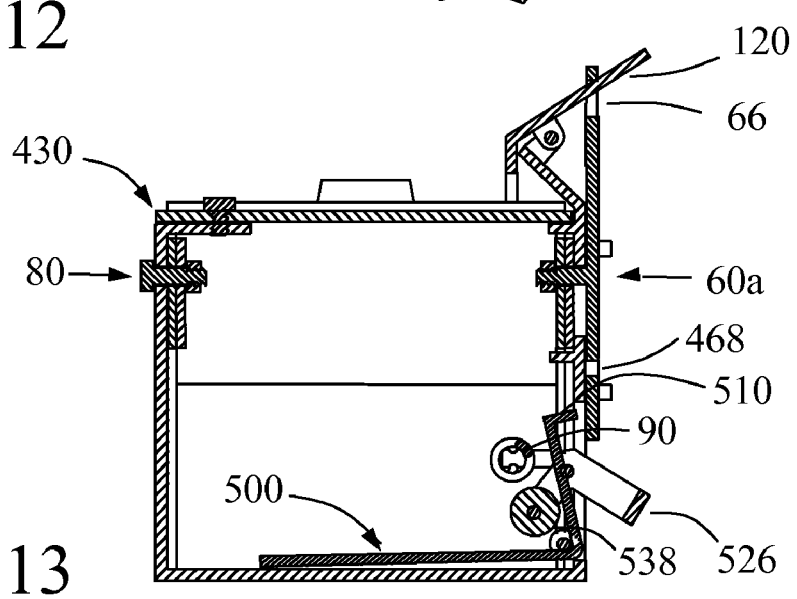
FIG. 13 is a cross-sectional view taken on line 2-2 of FIG. 10, showing the movable pivotal member in the release position and the pedal lift member in the normal position.
Figure 14:
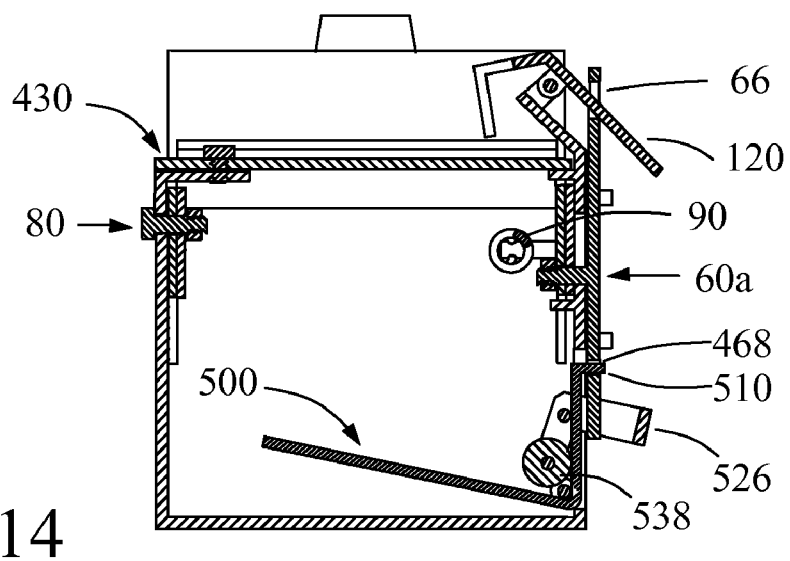
FIG. 14 is a cross-sectional view similar to FIG. 13, showing the movable pivotal member in the latch position and the pedal lift member in the lift position when the trap is being set.

As shown in FIG. 12, on the inside of forward wall portion 440 a pair of spaced pivot lugs 508 having transversally aligned pivot openings 512 are disposed on the side edges of opening 498. Another pivotal shaft 522 extends through pivot openings 512 and 506 such that trigger pedal member 500 may tilt on lugs 508 with upright portion 502 substantially fitting into the space of opening 498. The positioning of latching member 510 is so arranged that it will protrude forwardly outwardly into opening 468 of pivotal member 60a while the rear platform portion of trigger pedal member 500 is raised. As shown in FIG. 12, on the inside of forward wall portion 440, a pair of spaced pivot lugs 524 having transversally aligned pivot openings 514 are disposed on the side edges of opening 498 above lugs 508. Another pivotal shaft 522 extends through pivot openings 514 and 532 such that pedal lift member 520 is pivotally mounted on forward wall portion 440 with rubber roller 538 displaced behind upright portion 502. Pedal lift member can rotate from a normal position to a lift position. In the normal position, pedal lift member 520 tilts forwardly by gravity with forward portion 526 lowered and rubber roller 538 away from the inside surface of upright portion 502, as shown in FIG. 13. In the lift position, pedal lift member 520 is tilted with forward portion 526 raised and rubber roller 538 engaged with the inside surface of upright portion 502 and pushing latching member 510 protruding forwardly into opening 468, as shown in FIG. 14.

As shown in FIG. 11, locking member 540 comprises a tilted top portion 542, a vertical middle portion 544, and two side bottom portions 546 extending horizontally forwardly. Top portion 542 extends upwardly forwardly at an angle of approximately 45° relative to the middle portion 544. Top portion 542 comprises a pair of spaced pivot lugs with transversally aligned openings 548. The end of top portion 542 extends through opening 66 and serves as press handle 120.

In the assembling of locking member 540, another pivotal shaft 522 extends through a torsion spring 554 and pivot openings 446 and 548. Torsion spring 554 exerts a force on handle 120 to move pivotal member 60a upwardly and turns bottom portions 546 forwardly until bottom portions 546 engage with the inside surface of forward wall portion 440. In this situation, bottom portions 546 hinder arms 26a and 426a from moving upwardly such that housings 20 and 420 are locked in the close position. When press handle 120 is moved to a distance between the upper edge and the lower edge of opening 66, bottom portions 546 turn into the spaces defined by recesses 434, respectively. Arms 26a and 426a can move upwardly and housings 20 and 420 are unlocked. When housings 20 and 420 are rotated to the open position, press handle 120 can be further pressed against the lower edge of opening 66 and pivotal member 60a is pressed downwardly to the latch position and then latched by latching member 510.

To set the trap, press handle 120 and pedal lift member 520 are grasped by one hand and grip portions 28 and 428 are grasped by other hand. First, press handle 120 is pressed downwardly against torsion spring force to unlock arms 26a and 426a. Then housings 20 and 420 are pulled upwardly inwardly to the open position. Then press handle 120 is continuously pressed to push pivotal member 60a to the latch position until latching member 510 protrudes forwardly into opening 468. When press handle 120 and pedal lift member 520 are released, pivotal member 60a is latched by latching member 510 which remains in opening 468. In this situation, pin portion 64a is below the tension line such that spring 90 exerts a turning force in the opposite direction on arms 26a and 426a of housings 20 and 420 and in fact helps hold housings 20 and 420 in the open position. FIG. 15 illustrates housings 20 and 420 are pulled in the close position by spring 90 when movable pivotal member 60a is in the release position. FIG. 16 illustrates housings 20 and 420 are held in the open position when movable pivotal member 60a is latched in the latch position.

Bait may be placed on the platform portion of trigger pedal member 500. Cover plate 430 may be temporarily removed for placing the bait. Since this trap may be placed along the edges of a wall to leave a runway for rodents, the trap can be used without the bait.

The size of the trap may be of any desired length, width, and height, according to the size of the largest targeted animals.

It is contemplated that, except springs, the parts of the trap can be made of common materials such as sheet metal, plastic, or other hard materials. The number of parts can be reduced if the trap is formed integrally of molding plastics, or like materials. The housings and the cover may be in part transparent, or with multiple peek openings, or made of wire meshes such that the entrapped animal can be conveniently checked.

It should be understood that, with use of the mechanism for controlling the movement of the trapping means described herein, various changes and modifications to the presently preferred embodiments will be apparent to those skilled in the art. Such changes and modifications may be made without departing from the spirit and scope of the present invention and without diminishing its attendant advantages. It is therefore intended that such changes and modifications be covered by the appended claims.

We claim:

1. An animal trap, comprising:
   (a) a base;
   (b) a trapping means mounted on said base and capable of moving rotatively between an open position and a close position;
   (c) a mechanism for controlling the rotative movement of said trapping means, said mechanism comprising at least one movable pivotal member and a pivot pin, said pivotal member capable of moving between a latch position in which said trapping means is not permitted to move from the open position to the close position and a release position in which said trapping means is permitted to move from the open position to the close position;
   (d) a trigger operative to hold said pivotal member in the latch position and said trigger further operative to release said pivotal member to move from the latch position to the release position;
wherein said trapping means is mounted on said base with said pivotal member and said pivot pin, wherein said pivotal member and said pivot pin have a pin portion upon which said trapping means rotates;
wherein said base comprises a first slot for receiving the pin portion of said pivotal member, wherein said trapping means comprises a second slot for receiving the pin portion of said pivotal member, wherein the positioning of said second slot is so arranged that when said trapping means is in the open position, said second slot is superposed with said first slot such that said pivotal member can move from the release position to the latch position with its pin portion moving along superposed said first and second slots.

2. The animal trap of claim 1, wherein said base comprises a first opening for receiving the pin portion of said pivot pin, wherein said trapping means comprises a second opening for receiving the pin portion of said pivot pin, wherein when said pivotal member is in the release position, the pin portions of said pivot pin and said pivotal member are pivotally aligned and the rotative movement of said trapping means is permitted, and when said pivotal member is in the latch position, the pin portions of said pivot pin and said pivotal member are nonaligned and the rotative movement of said trapping means is hindered.

3. The animal trap of claim 2, further including a first spring means for exerting a force on said trapping means, said first spring means having a tension line, wherein the positioning of said first spring means is so arranged that, when said pivotal member is in the release position, said first spring means exerts a closing force on said trapping means, and when said trapping means is in the open position and said pivotal member moves from the release position to the latch position, the pin portion of said pivotal member passes over the tension line such that said first spring means exerts a turning force in the opposite direction on said trapping means and helps maintain said trapping means in the open position.

4. The animal trap of claim 3, further including a second spring means for exerting a force on said pivotal member to move from the latch position to the release position.

5. The animal trap of claim 4, wherein said trapping means comprises two rotative housings symmetrically coaxially mounted on said base with said pivot pin and said pivotal member.

6. A mechanism, for controlling rotative movement of a trapping means mounted on a base of an animal trap, comprising:

(a) at least one first slot disposed on said base;
(b) at least one second slot disposed on said trapping means;
(c) at least one movable pivotal member and a pivot pin, wherein said trapping means is mounted on said base with said pivotal member and said pivot pin;
(d) a trigger;

wherein said trapping means is capable of moving rotatively between an open position in which said trapping means provides an entrance for an animal and a close position in which said trapping means is closed for trapping the animal therein; wherein said movable pivotal member is capable of moving between a latch position in which said trapping means is not permitted to move from the open position to the close position and a release position in which said trapping means is permitted to move from the open position to the close position; wherein said trigger is operative to hold said pivotal member in the latch position and said trigger further operative to release said pivotal member to move from the latch position to the release position;

wherein said pivotal member comprises a pin portion passing through said first and second slots, wherein the positioning of said second slot is so arranged that when said trapping means is in the open position, said second slot is superposed with said first slot such that said pivotal member can move between the release position and the latch position with its pin portion moving along superposed said first and second slots.

7. The animal trap of claim 6, wherein said pivot pin comprises a pin portion upon which said trapping means rotates, wherein said base comprises a first opening for receiving the pin portion of said pivot pin, wherein said trapping means comprises a second opening for receiving the pin portion of said pivot pin, wherein when said pivotal member is in the release position, the pin portions of said pivot pin and said pivotal member are pivotally aligned and the rotative movement of said trapping means is permitted, and when said pivotal member is in the latch position, the pin portions of said pivot pin and said pivotal member are nonaligned and the rotative movement of said trapping means is hindered.

8. The animal trap of claim 7, further including a first spring means for exerting a force on said trapping means, said first spring means having a tension line, wherein the positioning of said first spring means is so arranged that, when said pivotal member is in the release position, said first spring means exerts a closing force on said trapping means, and when said trapping means is in the open position and said pivotal member moves from the release position to the latch position, the pin portion of said pivotal member passes over the tension line such that said first spring means exerts a turning force in the opposite direction on said trapping means and helps maintain said trapping means in the open position.

9. The animal trap of claim 8, further including a second spring
   means for exerting a force on said pivotal member to move from the latch position to the release position.

10. The animal trap of claim 9, wherein said trapping means comprises two rotative housings to entrap a targeted animal therein, wherein said housings are symmetrically coaxially mounted on said base with said pivot pin and said pivotal member.

\* \* \* \* \*